June 4, 1957   J. J. MANCUSI, JR   2,794,287
FISHING LURES
Filed June 2, 1953
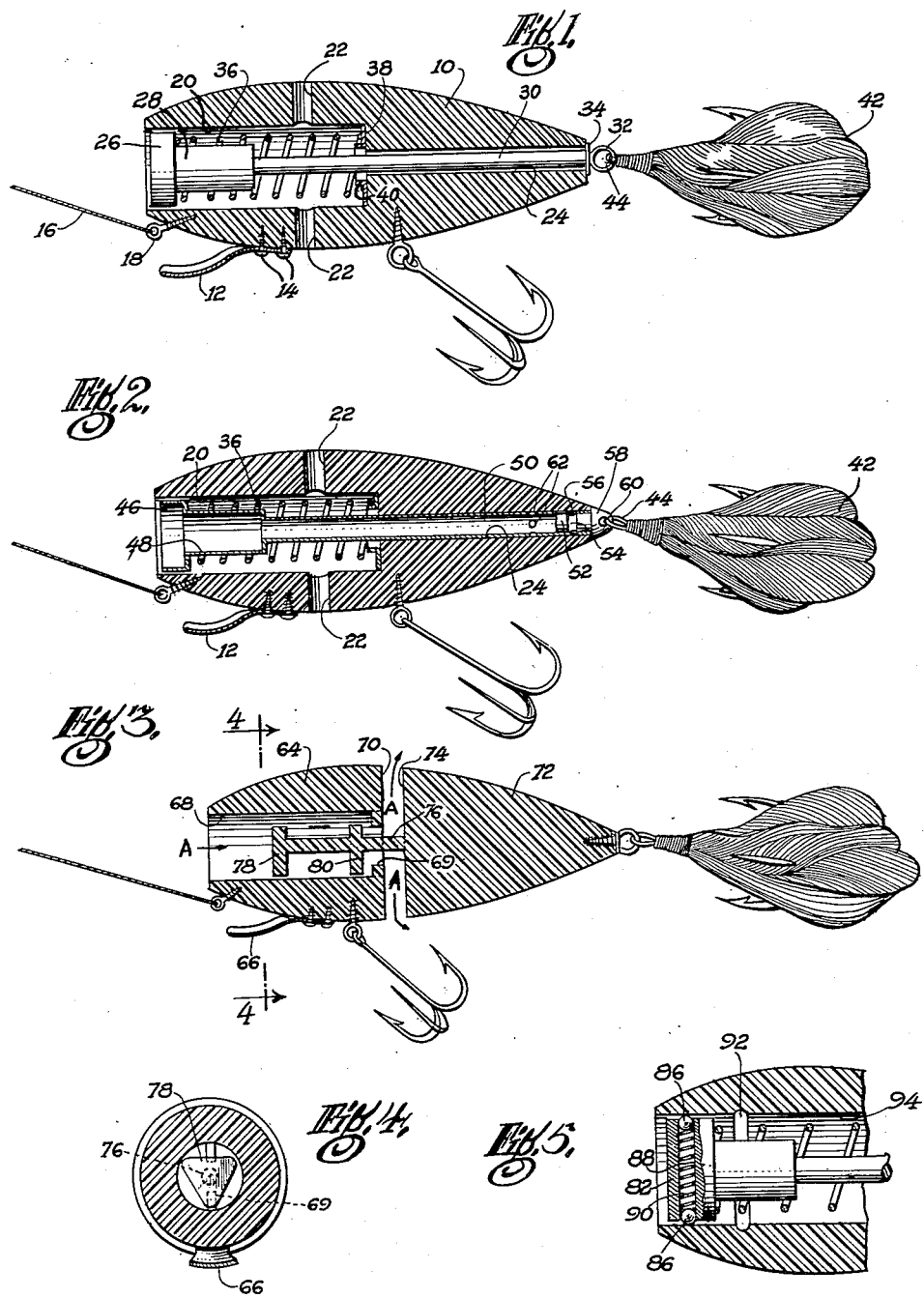
INVENTOR
Joseph J. Mancusi Jr.

United States Patent Office
2,794,287
Patented June 4, 1957

2,794,287
FISHING LURES
Joseph J. Mancusi, Jr., Eastchester, N. Y.
Application June 2, 1953, Serial No. 359,021
11 Claims. (Cl. 43—42.02)

This invention relates to artificial fish lures and, more particularly, to artificial lures of the type generally known as casting plugs.

As is well known, the success attendant the use of artificial lures is dependent on how well the motions of a creature that forms a portion of the diet of a game fish is simulated. Thus, plugs which are intended to resemble live minnows are adapted to undergo lateral darting movements. These lateral darting movements constitute a side to side movement or weave about the mean path of the plug. It will be appreciated that while such motions generally duplicate those of a live minnow, they do not completely do so for the reason that a minnow, or other fish for that matter, effects a change in direction by a strong flip of its tail. Nor can a good characterization of this tail movement be obtained by providing a trailing wiggler which idly follows the path taken by the main body.

Accordingly, it is an object of this invention to provide a fishing lure which more completely simulates the motion of live fish food as it is drawn through the water.

A more specific object of the invention is to provide a fish lure capable of duplicating the strong flip of its tail effected by a fish, such as a live minnow, in changing its direction of movement.

Another object of the invention is to provide a fishing lure of the type mentioned wherein the energy necessary to effect relative movements between articulated parts thereof is accumulated during the straight line movements thereby affording relatively lifelike action with a minimum of line manipulation on the part of the fisherman.

Still another object of the invention is to provide a fishing lure which is reliable in operation.

A further object of the invention is to provide a fishing lure that is simple in construction and easy of manufacture.

According to the invention, a fishing lure, capable of darting movements to either side of a mean path of movement, employs the Bernoulli principle for effecting relative movement between its parts upon sudden changes in the direction of its movement. As is well known, Benoulli's Theorem states a quantitative law relating to changes in pressure with changes in speed in fluid systems. It may be expressed as follows: When an incompressible liquid speeds up in going from one position to a second position, then its head due to elevation or pressure decreases.

It will be appreciated that a particle in front of a lure being drawn through water must travel a greater distance than another particle not similarly obstructed in order to effect an equal rearward displacement relative to the lure. This is so because the particle in front of the lure must travel in a curved path around the lure while the non-obstructed particle travels in a straight line. Since speed is a well known function of distance and time, it follows that the particle traveling in a curved path has a greater speed than the particle more remote from the path of the lure. Since the lateral pressure of a flowing stream of water decreases as its velocity increases, it is evident that the pressure along the sides of the lure is less than that present at the front end of the lure and that this pressure reduction is greatest at the maximum diameter of the lure where the speed of the water is greatest.

The fishing lure utilizes this difference in pressure during its longitudinal or straight line movements to store energy. Thus, a piston is mounted in a chamber in the nose of the fishing lure and is urged forwardly therein by a spring. Behind the piston, the chamber communicates with the exterior along the side surface of the lure, preferably at the point of maximum fluid velocity, namely, at the maximum diameter of the lure body. Hence, as the lure is drawn through the water, the reaction of the water upon the piston in the nose coupled with the decrease in pressure of the water along the side surfaces which is communicated to the chamber area behind the piston affords a differential pressure effect across the piston of sufficient magnitude to overcome the bias of the spring and move the piston rearwardly. The articulated portion of the lure is connected to the piston and drops further behind the main portion of the lure as the piston moves backward.

When the lure changes direction, the pressure differential which was built up across the piston as the lure moved in the straight line direction, is reduced. The lure may be imagined as then moving sideways in the water, and hence the water pressure upon the nose and side surfaces will approach each other, particularly on the surface facing the direction of travel. As this takes place, the piston is urged forward under the action of the spring and imparts to the articulated portion of the lure an action not unlike the tail flip employed by a fish, such as a minnow, in navigating a turn.

According to another feature of the invention, a continuous vibrating movement is also imparted to the articulated portion of the lure. This is obtained by forming the piston as a hollow body having a reduced portion adapted to extend out of the tail end of the lure. When the piston moves rearward to a maximum displacement, it is vented and this reduces the pressure head at the nose of the lure. The piston then jumps forward a distance sufficient to close the vent and the process is repeated. It should be observed that this movement is over and above that obtained when the fishing lure changes direction and that the strong jerk on the articulated portion takes place regardless of whether the piston is venting at that moment or not. This effect is not unlike that witnessed in many fluid controlling devices, such as valves and described as chatter or instability.

Still another feature of the invention resides in the many constructions to which it may be applied. Thus, it is not necessary that a trailing portion resembling a fish tail be employed. The invention may be employed to cause relative movement between major portions or halves of a fishing lure. Similarly, it may be employed to move the fins of fish-like lures or the wings of insect like lures, etc.

These and other objects, features, and advantages of the invention will become apparent from a consideration of the following description and the accompanying drawings, which disclose by way of example, the best modes which have been contemplated for constructing the invention.

In the drawings:
Figure 1 is a longitudinal vertical sectional view through a fishing lure constructed according to the invention.

Figure 2 is a longitudinal vertical sectional view through a slightly modified form of fishing lure.

Figure 3 is a longitudinal vertical sectional view through still another embodiment of the invention.

Figure 4 is a front end view of the lure shown in Figure 3.

Figure 5 is a partial longitudinal vertical sectional view through a modified construction.

Referring more particularly to the drawings, and especially to Figure 1, the lure shown therein includes a streamlined body or plug 10, generally ovate in longitudinal cross-section which is formed of plastic, wood, or other material having a specific gravity which renders it more or less buoyant depending upon the design requirement for a shallow or deep running lure. The plug is streamlined not only to facilitate its being drawn through water but also to effect a streamlined flow of the water about the plug, as non streamlined or turbulent flow decreases the operability of the fishing lure.

Mounted on the bottom of the front end of the plug 10 is a spoon 12. The spoon provides the means whereby the plug 10 seeks its depth beneath the surface of the water when the lure is drawn through the water by the fisherman as by reeling in. It also constitutes the instrumentality by which a side to side or weaving motion is imparted to the lure. The use of a spoon to effect the above identified functions is old in the art and needs no particular explanation here, it being sufficient to point out that it extends downwardly and forwardly from the main body and is generally dish-shaped in transverse cross-section. The spoon 12 is attached to the main body by any suitable means, as for example, screws 14.

As is obvious, the fishing lure is drawn through the water by means of a fish line 16 which extends upwardly and forwardly from the lure to which it is attached as by an eye screw 18. The point of attachment of the eye screw 18 is in the lower portion of the nose of the plug 10 so that the tug on the fish line 16 produces a force upon the fishing lure which tends to counteract those induced by the spoon 12 and maintains the plug 10 substantially horizontal as it is drawn through the water.

Extending inwardly from the nose of the plug 10 is a cylindrical chamber 20. Preferably, the chamber terminates behind a plane containing the greatest cross-sectional area of the plug 10. At the plane containing the greatest cross-sectional area, there are provided a plurality of radially extending openings 22 of reduced diameter compared to the chamber 20 and by which the chamber communicates with exterior points on the side surfaces of the plug 10. At the rear end of the chamber 20, a longitudinally extending opening 24 of reduced diameter compared to the chamber 20 connects the chamber 20 with the exterior at the rear end of the plug 10.

Slidably mounted in the chamber 20 is a piston 26. Formed integrally with the piston 26 is a guide 28 of reduced diameter. A slide 30 extends away from the guide 28 to which it is fixed. The slide 30 is snugly yet movably received in the longitudinally extending opening 24 in the plug 10 and terminates at the end of the opening 24. An eye screw 32 secures a washer 34 to the end of the slide 30 which thus serves as a stop to limit the movement of the piston 26 toward the nose of the body 10.

The piston 26 is normally held in a forward position determined by the washer 34 by a coil spring 36. The coil spring is of an interior diameter which enables it to be centered by the guide 28. It is, however, of a smaller external diameter than the diameter of the chamber 20 so as not to engage the same frictionally. The other end of the spring is centered by a washer 38 having an inturned flange 40.

When the lure is drawn through the water it assumes the horizontal position shown in the drawing. Through the action of the spoon 12 it darts in straight lines first to one side of a mean path and then to the other side, the changes in direction being rather abrupt. When the lure is traveling in a straight line, the pressure on the nose of the plug 10 increases due to the impinging action of the water while the pressure on the side surfaces of the plug 10 decreases due to the Bernoulli effect. This results in an increase of pressure on the forward side of the piston and a decrease in pressure on the interior side, the combined effect of which overcomes the bias of the spring 36 and moves the piston to the rear. The rearward limit of displacement of the piston is determined by the engagement of the guide 28 with the washer 40. This disposes the fish tail simulating portion 42 of the lure in a rearward position for a movement forward. As shown this fish tail simulating portion 42 may be a plurality of feathers which are suitably secured to and hide a treble fish hook 44 secured to the piston through the medium of the eye screw 32 attached to the slide 30.

When the plug 10 negotiates a sharp turn in direction due to the action of the spoon 12, the momentary net effect upon the plug is not unlike a sidewise movement of the plug. Under such a condition the water pressures at the nose and on the side facing the direction of travel would be approximately equal and these pressures would be communicated to both sides of the piston. This is a sudden change and results in the spring 36 throwing the piston forward. As the piston is connected to the fish tail simulating portion 42, the latter is jerked forward almost simultaneously with the change in direction of the plug. The action is similar to the flip of the tail of a fish navigating a turn, and is peculiarly enhanced here because the tail portion 42 is no longer in line with the plug 10 when the flipping action takes place. This action is repeated as often as the lure changes its direction in the water.

It should be observed at this point that the action of the lure is enhanced by timely changes in the length of the lure. Thus when the lure is traveling in a straight line through water, its length increases and makes for a more stabile streamlined action. Upon negotiating a turn, however, the sudden collapse of the lure decreases the moment of the lure and facilitates its turning. While this action is supplementary and could be dispensed with as in lures wherein the action of the piston is used to shift appendages such as fins, it is nonetheless desirable.

It may also be observed that a desirable lure action, in which the lure undergoes sudden changes in length, may be obtained without the use of a spoon 12. Thus, if a lure is of specific gravity sufficient to sink the lure beneath the surface of the water and the fisherman subjects the lure to short straight motions, it will lengthen as it is drawn through water and suddenly shorten when it is allowed to come to rest.

In Figure 2 there is shown a modification in which the heretofore described action of the lure is supplemented by a continuous vibrating action on the part of the tail which also aids the tail flipping action. In the fishing lure shown in Figure 1, the piston 26, the guide 28, and the slide 30 may be hollow or solid. In this embodiment, which otherwise is similar to that of Figure 1 the piston 46, the guide 48, and the slide 50 are hollow and form one continuous channel. The other end of this channel is closed by a plug 52 having a circumferential depression 54 through which it is attached to the slide 50 by a crimp 56 thereon. The plug 52 is formed with a flange 58 which serves the function of the washer 34 in the embodiment of Figure 1. An opening 60 in the plug 52 receives the end of the usual treble hook in the tail portion.

The vibrating motion of the tail portion is obtained by venting the slide 50 with the apertures 62. These apertures become exposed when the piston moves rearward during the straight line movements of the fishing lure. In this embodiment, however, as soon as the apertures 62 are exposed, the pressure in front of the piston is reduced so that it moves forward under the influence of the spring 36. As soon as the apertures are withdrawn within the confines of the opening 24, the pressure reestablishes itself in front of the piston. Thus, the action is repetitive. This instability results in a vibratory or buffing action on the part of the tail portion 42 which is similar to the usual small flips undergone by the tail of a fish moving straight ahead. The action is not so severe as to materially impair the large flips imparted to the tail when the plug 10 changes its direction. In fact it abets it by preventing any tendency to stick.

In Figure 3, there is shown a modified form of the invention in which two relatively movable parts 64 and 72 form a plug having the same general shape as the plug 10 shown in the earlier discussed embodiments. The front portion 64 of the lure mounts the spoon 66 and the chamber 68 extending longitudinally from the nose of the lure. It terminates in a flat face 70. The chamber 68 communicates with the exterior of the front portion through an opening 69. The rear portion 72 of the lure is provided with a front face 74 which is similar to the flat face 70 on the portion 64.

The rear portion 72 is movably connected to the front portion 64 through a shaft 76 which projects forwardly from the face 74. The shaft 76 loosely extends through the opening 69 in the rear end of the front portion 64. The front end of the shaft mounts the triangular bearing 78 (Figure 4). A second triangular member 80 limits the rearward movement of the shaft 69, and hence, the rearward movement of the portion 72 relative to the front portion 64 by engaging the rear end of the chamber 63.

When this lure is drawn through the water, the water pressure acting upon the sides of the lure at the point of juncture of the front portion 64 and the rear portion 72 effects a drop in pressure between the faces 70 and 74. The pressure between the flat surfaces 70 and 74 is approximately that on the exterior surfaces at the juncture and, hence, the rear portion moves forward until the surfaces 70 and 74 are in close proximity, even overcoming the impinging action of the water on the effective areas exposed in the chamber 68. However, when the lure undergoes a change in direction or when it is slowed down, the pressure differential between the different points on the exterior surface of the lure is reduced and the rear portion pops back due to the impinging force of the water acting upon the surface of the rearward portion 72 exposed in the chamber 68, and due also to the drag of the water upon this rearward portion. Thus, the portions 64 and 72 of the lure can be made to undergo repeated axial displacements.

The action of this lure is enhanced by permitting flow through the chamber 68 as indicated by the arrows labelled A Fig. 3 past the triangular bearing members 78 and 80 and through the opening 69 and thence radially outward via the passage afforded between the faces 70 and 74. This outward flow brings to bear another Bernoulli or Venturi effect that assists in reducing the gap between the two faces 70 and 74 on the respective forward and rearward lure portions 64 and 72.

Figure 5 discloses a scheme whereby the sharpness of action of the lures disclosed in Fig. 1 may be improved. It contemplates the use of a detent means which will require that a certain pressure differential has come into being before the parts of the lure undergo relative movement. The higher pressure differential will then make for a more forceful movement. While the detent means may take many forms and restrain action in both directions until the desired pressures have come into being, that shown in Figure 5 is effective only to prevent collapse of the lure until the pressure differential upon the piston 82 due to the Bernoulli effect has decreased through a predetermined minimum. Thus, when the lure shortens under the action of the spring 84 upon the piston 82, there will be no effective force opposing the action of the spring and the collapse of the lure will be most sudden. The detent means is obtained by urging a pair of balls 86 out of a bore 88 in the piston 82 by a compression spring 90 and providing a groove 92 about the inner end of a chamber 94. When the balls 86 are seated in the groove 92, the piston will be restrained against gradual movement.

While there have been shown and described various embodiments illustrative of the invention, it will be understood that other and still different embodiments may be made by those skilled in the art without departing from the spirit of invention which is intended to be defined by the appended claims.

What is claimed is:

1. In a fishing lure having a secondary part movable relative to an elongated main body that is alternately subjectable to one pressure at its front end and lower pressure on its side surface as it is drawn through water, said main body having a chamber extending inwardly from its front end and an opening of reduced diameter extending axially away from the rear end of said chamber and through said body, a piston formed with an opening and movable in said chamber, a tube closed at one end and fixed at its other end to said piston so as to seal off the inner end of said chamber from said piston opening, said tube being slidably received in said opening of reduced diameter, said body having an opening connecting the inner end of said chamber with the exterior on the side surface to subject it to the lower pressure, means for urging said piston toward the open end of said chamber with a first force that may be overcome by a second force resulting from the difference in said pressures acting upon and operative to move the piston inwardly in said chamber, and means for connecting said secondary part for movement with said piston, said tube having an opening in its rear end that is vented when the piston moves rearward to reduce the pressure in front of the piston and induce a small forward movement thereof until the venting is ended.

2. In a fishing lure having relatively movable parts having pressure developing zones and shaped to develop different pressures at different zones when moved in a straight line through water and less different pressures at these same zones when undergoing a change in direction, means biasing to a normal position one part relative to another part, means for automatically causing the lure to travel first in one and then in another direction, and other means responsive to the difference in pressures developed at said zones during each straight line movement of the lure for moving the biased part from the normal position, the biasing means being effective to restore the one part to the normal position upon each change in direction of the lure.

3. In a fishing lure having relatively movable fore and aft parts having pressure developing zones and shaped to develop different pressures at different zones when moved in a straight line through water and less different pressures at these same zones when undergoing a change in direction, first means biasing forward to a normal position the aft part relative to the fore part, second means for automatically causing the lure to travel first in one and then in another direction as it is drawn through water, and third means responsive to the difference in pressures developed at said zones during each straight line movement for overcoming the bias of the first means to move the aft part rearward from the normal position, said first means being effective to move the aft part forward to the normal position upon the development of less different pressures at said zones on a change in direction of the lure.

4. In a fishing lure having relatively movable fore and aft parts having pressure developing zones and shaped to develop different pressures at different zones when moved in a straight line through water and less different pressures at these same zones when undergoing a change in direction, means for automatically causing said lure to travel first in one and then in another direction when drawn through water, means for causing said aft part to move to a normal position relative to the fore part upon each change in direction of the lure, and means responsive to the difference in pressures developed at said zones during each straight line movement of the lure for moving the aft part from the normal position.

5. In a fishing lure having relatively movable parts of which at least one is formed with a streamline shape adapted to enable streamline flow about it when it is drawn in a straight line through water, said streamlined flow resulting in lower pressures created at the sides of the lure than the pressure at an end of the lure when drawn through water, means for biasing the parts to normal positions with respect to each other, and means responsive to the difference between the lower pressure created on the side surface of the lure and the pressure created at an end of the lure upon straight line movement for moving the biased parts from their normal positions relative to each other.

6. In a fishing lure having relatively movable parts which are biased to normal positions with respect to each other, at least one of said parts having surfaces shaped to enable streamline flow relative to said part when said part is moved in a straight line through water, said streamlined flow resulting in lower pressures at said surfaces than at an end of said part, and means responsive to the difference between lower pressures created by the streamlined flow and pressure at an end of the lure during straight line movement for moving the biased parts relative to each other.

7. In a fishing lure having a secondary part movable relative to a main body that is shaped to develop different pressures at different portions thereof when moved in a straight line through water, said main body having a chamber therein, a piston movable in said chamber, said body having means for applying one of said pressures to one end of said chamber, said body having means for applying a higher one of said pressures to the opposite end of said chamber, means for urging said piston toward the opposite end of the chamber with a first force that may be overcome by a second force resulting from the difference in said pressures acting upon said piston to move the piston toward the one end of said chamber, and means for connecting said secondary part to said piston for movement thereby.

8. In a fishing lure having a secondary part movable relative to an elongated main body that is shaped to develop one pressure at its front end and lower pressure on its side surface when moved in a straight line through water, said main body having a chamber extending inwardly from its front end, a piston movable in said chamber, said body having an opening connecting the inner end of said chamber with the exterior on the side surface to subject said inner end to the lower pressure, means for urging said piston toward the front end of said main body with a first force that may be overcome by a second force resulting from the difference in said pressures acting upon and operative to move the piston toward the inner end of said chamber, and means for connecting said secondary part to said piston for movement thereby.

9. In a fishing lure having relatively movable parts and shaped to develop different pressures at different zones when traveling in a straight line through water and less different pressures at these same zones when undergoing a change in direction, means for automatically causing the lure to travel first in one direction and then in another direction, and means responsive to the change in pressure at the different zones when the lure undergoes a change in direction for effecting relative movement between the parts of the lure.

10. In a fishing lure that repeatedly changes its direction as it is drawn through water, a first part having a chamber, a second part movable relative to the first part, a piston in said chamber defining a first side and a second side thereof, said first part having first pressure transmitting means connecting the first side of said chamber with one zone on the exterior of said first part, said first part having second pressure transmitting means connecting the second side of said chamber with a second zone on the exterior of said first part, said second zone embracing a greater area than that containing the first zone, means urging the piston toward one end of said chamber, and means connecting the second part to the piston for movement thereby.

11. In a fishing lure comprising a plurality of relatively movable parts, an elongated part having a chamber extending inwardly from its front end and shaped to develop one pressure at its front end and a lower pressure on its side surface when drawn through water in a straight line, a spoon attached to the underside of said part and extending downwardly and forwardly therefrom, means connected to the elongated part between said chamber and said spoon for the attachment of a fishing line to draw the lure through water, a piston in said chamber, said elongated part having an opening extending from the inner end of said chamber to the exterior along the side surface of said elongated part, a spring biasing said piston toward the front end of said chamber with a force which may be overcome by a pressure differential on the piston induced by motion through water to move said piston, a second part movable relative to the elongated part, and means connecting the second part to said piston for movement thereby.

References Cited in the file of this patent

UNITED STATES PATENTS

| | | |
|---|---|---|
| 811,456 | Thurston | Jan. 30, 1906 |
| 1,477,756 | Heddon et al. | Dec. 18, 1923 |
| 1,538,658 | Rindt | May 19, 1925 |
| 2,153,489 | Whitis | Apr. 4, 1939 |
| 2,183,059 | Bacon | Dec. 12, 1939 |
| 2,217,677 | George | Oct. 15, 1940 |
| 2,437,523 | Hahn | Mar. 9, 1948 |
| 2,517,495 | Kneece | Aug. 1, 1950 |
| 2,532,879 | Baker | Dec. 5, 1950 |
| 2,565,099 | Simmons | Aug. 21, 1951 |
| 2,589,343 | Cieslik | Mar. 18, 1952 |
| 2,665,512 | Sullivan et al. | Jan. 12, 1954 |